Figure 1:
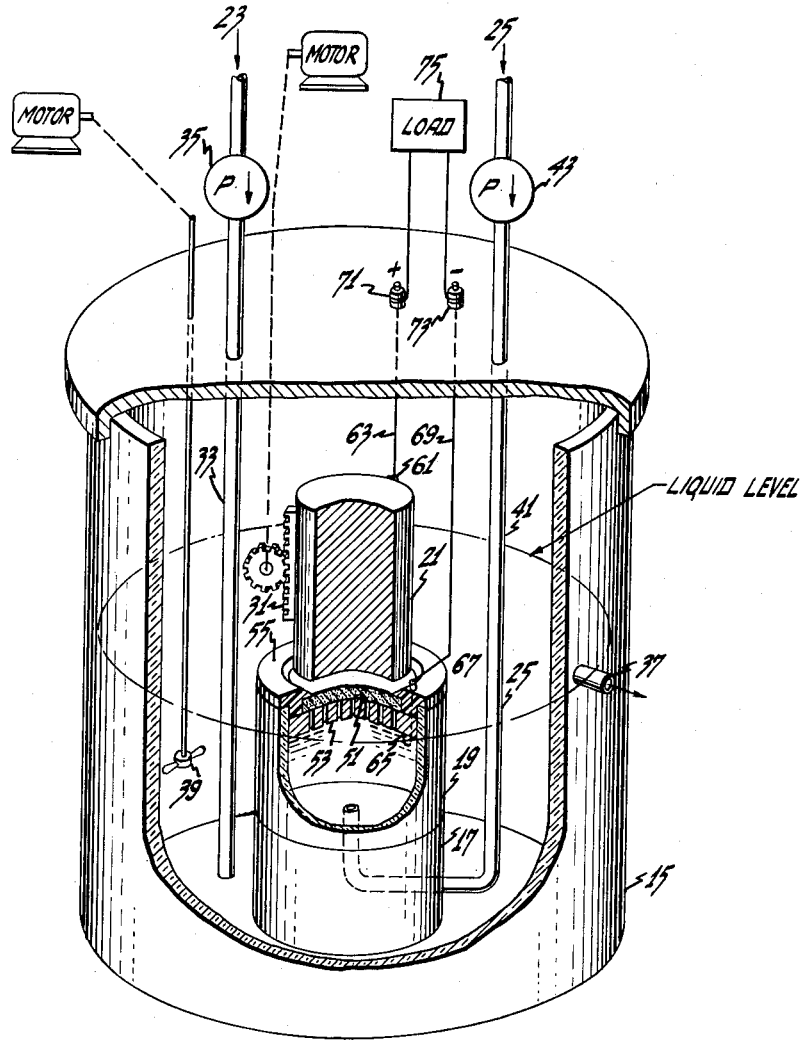

March 21, 1961

C. K. MOREHOUSE ET AL 2,976,342

FUEL CELLS

Filed Dec. 31, 1956

2 Sheets-Sheet 1

INVENTORS
RICHARD GLICKSMAN
GERALD S. LOZIER &
CLARENCE K. MOREHOUSE

BY R. C. Whittaker

ATTORNEY

INVENTORS
RICHARD GLICKSMAN
GERALD S. LOZIER &
CLARENCE K. MOREHOUSE

BY

J. L. Whittaker
ATTORNEY

' # United States Patent Office 2,976,342
Patented Mar. 21, 1961

2,976,342

FUEL CELLS

Clarence K. Morehouse and Gerald S. Lozier, Princeton, and Richard Glicksman, Highland Park, N.J., assignors to Radio Corporation of America, a corporation of Delaware Filed Dec. 31, 1956, Ser. No. 631,555

14 Claims. (Cl. 136—100)

This invention relates to fuel cells and particularly, but not necessarily exclusively, to improved fuel cells which operate at substantially atmospheric temperatures and pressures.

Fuel cells are electrochemical devices in which the chemical energy of an anode and a cathode is converted directly into electrical energy by electrochemical processes. Fuel cells are similar to primary cells in that they generally do not have efficiently reversible chemical reactions. In primary cells, once the chemical energy is converted to electrical energy, the cells are discarded. Fuel cells are not discarded when the chemical energy is converted to electrical energy. Instead the spent cathode and anode material is removed and replaced with fresh material.

Previous fuel cells have had one or more of the following undesirable characteristics: (1) they operate at pressures above two atmospheres necessitating special pressure-containing equipment, (2) they operate at temperatures above 100° C. necessitating special heating and insulation equipment and heat resistant construction, (3) they use gaseous anode or cathode materials which are bulky to store and require special handling techniques, (4) they use materials which come into short supply in times of emergency because the materials become critical to the interests of the U.S. as a whole. These materials may become critical because they are supplied from foreign sources, or because domestic ore sources are limited in size and mining capacity, or for some other economic reason.

An object of this invention is to provide improved fuel cells.

Another object is to provide improved electric power producing devices which operate at substantially normal temperatures and pressures.

A further object is to provide improved fuel cells which use solid and/or liquid anodes and cathodes.

Another object is to provide improved fuel cells including materials which are non-strategic, can be readily available in large quantities in the U.S. and are comparatively inexpensive.

Still another object is to provide improved electrochemical methods for producing electric power at a desired rate.

In general, the foregoing objects are accomplished in the improved electric power producing devices of the invention which comprise a reaction chamber, means for feeding an anode into said reaction chamber, means for feeding a cathode into said reaction chamber, said cathode comprising an organic oxidizing material having radicals selected from the class consisting of nitro, nitroso, azo and positive halogen, means for circulating liquid electrolyte through said reaction chamber, means for maintaining said anode and said cathode in a predetermined spaced relationship, and connection means for conducting electric power from said device attached thereto.

The improved methods of the invention comprise introducing an anode into a reaction zone at a rate which is a function of the rate at which electric power is desired, introducing a cathode into the reaction zone at a rate which is a function of the rate at which electric power is desired, said cathode including an organic oxidizing material, maintaining an electrolyte in contact with said anode and said cathode, drawing electric power generated in said reaction zone at said desired rate, removing the reaction products from said reaction zone, and maintaining each of said steps at substantially normal temperatures and pressures.

By using organic oxidizing materials of the type more fully described below, each of the undesirable characteristics of the previous fuel cells is avoided. Thus, one may operate the fuel cell herein at substantially atmospheric temperatures and pressures, avoid the use of gaseous chemical constituents and, at the same time, use chemical constituents which may be synthesized in large quantities at low costs within the United States. The fuel cells herein avoid many of the problems associated with primary cells, such as shelf life and corrosion, by bringing the anode and cathode together only when electric power is desired.

Figure 2:
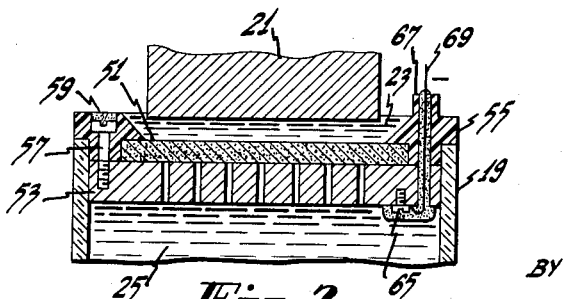
Figure 3:
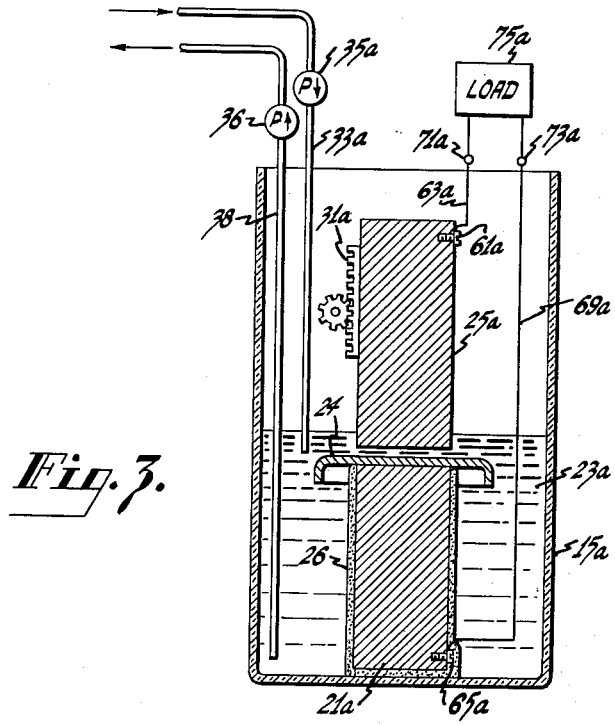
Figure 4:
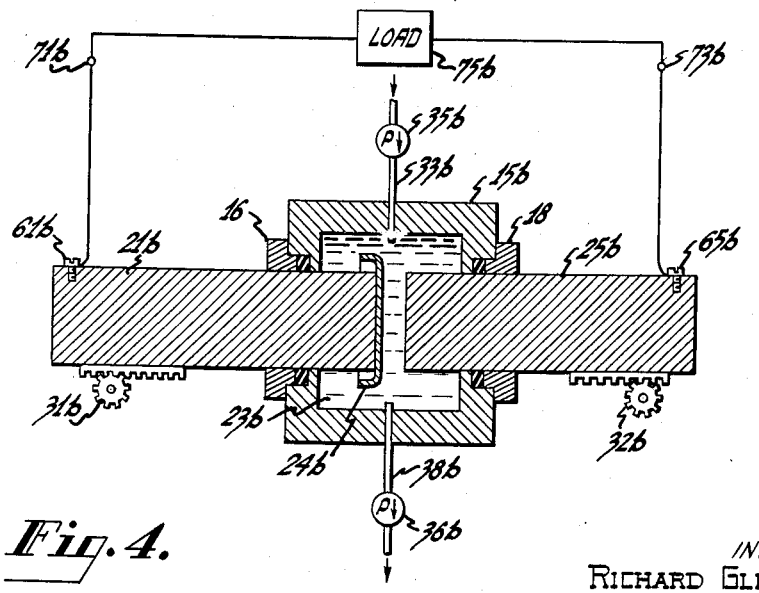

The invention is described in greater detail by reference to the drawings in which, Figure 1 is a partially sectional, partially schematic view of a first fuel cell of the invention, Figure 2 is a detailed sectional view of the reaction zone of the fuel cell of Figure 1, Figure 3 is a partially sectional, partially schematic view of a second fuel cell of the invention, and Figure 4 is a partially sectional, partially schematic view of a third fuel cell of the invention.

*Example 1.*—Figures 1 and 2 illustrate a fuel cell of the invention having a solid anode and a liquid cathode. The fuel cell comprises a corrosion-resistant container 15, as of glass. A pedestal 17 of an inert material supports a glass cathode compartment 19 within the container 15. A liquid cathode material 25 is fed by a constant head pump 43 into the cathode compartment 19 via a glass duct 41.

The upper portion of the cathode compartment 19 is completely closed by an assembly which comprises a brass contact plate 53, a Teflon sealer ring 55 attached to the plate 53 with screws 57 and porous graphite plate 51 held between ring 55 and the plate 53. The plate 53 has holes therein to permit the passage of cathode material therethrough and is designed to make a good electrical contact with the disc 51. The screws 57 are counterbored and sealed to prevent corrosion, as with a silicone grease. A cathode lead wire 69 is electrically connected to the plate 53 by a screw 65 and passes through the plate 53, the ring 55 and a spacer 67 to a terminal 73. The entire path of the cathode lead wire 69 is electrically-insulating and sealed from corrosion, as with a silicone grease.

An anode 21, preferably a rod of metal or alloy approximately the diameter of hole in the ring 55 is mounted on feeding means 31 which allows the anode to be fed at a controlled rate. A rack and pinion is an example of such feeding means. An anode lead wire 63 is connected to the anode by means of a screw 61 and passes to a terminal 71. The terminals 71 and 73 respectively provide connection means for an external load 75.

An electrolyte 23 is fed into the container 15 by a pump 35 through a duct 33. The electrolyte in the container is agitated by a propeller 39 and maintained at a desired level in the container 15 by an overflow outlet 37. The effluent may be recirculated or disposed of as desired by conventional means not shown.

To operate the fuel cell of Figure 1, a liquid cathode material, such as 2,2 chloronitropropane, which is a liquid at room temperature, is pumped by the constant head pump 43 at a rate proportional to a rate at which electric power is desired. The pumping action is adjusted such that a maximum use of the cathode material is made. The cathode material fills the compartment 19 and passes upward through the holes in the plate 53 and diffuses upward through the pores of the disc 51 emerging on the surface of the disc 51. An electrolyte comprising an aqueous solution of the hexahydrated magnesium bromide (500 g./l.) is pumped into the container 15 through duct 33 bringing the level up to the overflow 37 and slightly above the porous graphite disc 51. The electrolyte is pumped and agitated throughout the operation of the cell at a convenient rate to provide some overflow and to remove the spent reaction products.

The anode 21 is a rod of magnesium base alloy designated AZ10A and has the approximate composition 98.4% magnesium, 1.2% aluminum, 0.5% zinc and 0.10% calcium. The outside diameter of the rod is slightly smaller than the inside diameter of the ring 55. By way of example, the rod is 1.170 inches in diameter and the inside diameter of the ring is about 1.25 inches in diameter. The anode 21 is square at the bottom and is mounted on feed means 31 such that the bottom of the anode is closely spaced from the disc 51 and is immersed in the electrolyte 23. The anode 21 is then fed downward at a rate proportional to the rate at which electric power is desired. By simple manipulation the optimum anode-disc spacings is determined for each cell. The space between the anode 21 and the disc 51 constitutes a reaction zone where the anode material is chemically oxidized and, simultaneously, the cathode material is chemically reduced. The reaction products are carried away by the flow and agitation of the electrolyte 23. A potential difference between the anode 21 and the disc 51 induces a flow of electric current through the external load 75 in a conventional manner.

In the specific example above described, the open circuit voltage is about 1.05 volts. With a constant current drain of 100 milliamperes, the following voltage readings were taken at the time intervals indicated:

| Hours: | Voltage |
|---|---|
| 0 | 1.06 |
| 1.0 | 1.05 |
| 1.5 | 1.06 |
| 2.2 | 1.05 |
| 3.0 | 1.05 |
| 6.7 | 1.04 |
| 9.2 | 1.04 |
| 13.7 | 1.03 |

The following chemical reactions are believed to occur during the conversion of chemical energy to electrical energy in the fuel cell of Example 1.

*Anode reaction*

$$3Mg \rightarrow 3Mg^{++} + 6e^-$$

*Cathode reaction*

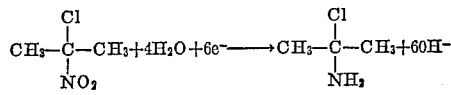

*Overall reaction*

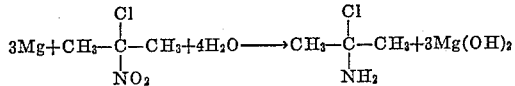

The fuel cells of the invention comprise generally the following parts:

(1) An anode selected from the group of materials consisting of magnesium, manganese, aluminum, zinc and alloys based thereon, (2) Means for feeding the anode into a reaction chamber, (3) A cathode including an organic oxidizing material in which the oxidizing properties thereof are due at least in part to chemically combined nitro, nitroso, azo or positive halogen groups. The cathode may also include an inorganic oxidizing substance, other organic oxidizing materials, and materials for increasing the electrical conductivity of the cathode, (4) Means for feeding the cathode material into the reaction chamber, (5) A liquid electrolyte which may include substances for modifying the electrical conductivity thereof, (6) A reaction chamber where the anode is oxidized and the cathode reduced to convert the chemical energy thereof to electric power, (7) Means for circulating said liquid electrolyte through said reaction chamber.

*The anode.*—The term "anode" includes magnesium, aluminum, zinc, manganese metals, and alloys based on one or a combination of these metals. A base alloy is one wherein the predominant ingredient is the designated metal. Thus, a magnesium base alloy which has more than 50% magnesium is satisfactory. It is preferred however, that the anode have as high a proportion of magnesium, aluminum, zinc and manganese as possible. Other ingredients are added to the metal base to improve the properties of the anode for fabrication purposes, to impart a greater degree of corrosion resistance or for other reasons.

Table I sets forth examples of magnesium base alloys which are suitable for anodes in the fuel cells herein together with corresponding ASTM designations where they are available. Table II sets forth examples of aluminum base alloys which are suitable for anodes in the fuel cells herein.

TABLE I.—MAGNESIUM BASE ALLOYS FOR ANODES

| Alloy No. | A.S.T.M. Designation | Nominal Composition [1] | | | | | |
|---|---|---|---|---|---|---|---|
| | | Al | Mn | Zn | Zr | Ce | Ca |
| 1 | A3 | 3.0 | 0.2 | | | | |
| 2 | A4 | 4.0 | 0.2 | | | | |
| 3 | A8 | 8.0 | 0.1 | | | | |
| 4 | A10 | 10.0 | 0.1 | | | | |
| 5 | A12 | 12.0 | 0.1 | | | | |
| 5a | AZ10A | 1.0 | | 0.5 | | | 0.10 |
| 6 | AZ31 | 2.8 | 0.3 | 1.0 | | | |
| 6a | AZ31X | 3.0 | 0.2 | 1.0 | | | 0.15 |
| 7 | AZ33 | 3.0 | 0.2 | 3.0 | | | |
| 8 | AZ61 | 6.5 | 0.2 | 0.7 | | | |
| 9 | AZ63 | 6.0 | 0.2 | 3.0 | | | |
| 10 | AZ81 | 8.5 | 0.2 | 0.5 | | | |
| 11 | AZ91 | 9.0 | 0.2 | 0.6 | | | |
| 12 | AZ92 | 9.0 | 0.1 | 2.0 | | | |
| 13 | E6 | | | | | 6.0 | |
| 14 | EM42 | | 2.0 | | | 4.0 | |
| 15 | EM62 | | 2.0 | | | 6.0 | |
| 16 | M1 | | 1.5 | | | | |
| 17 | M2 | | 2.0 | | | | |
| 18 | ZK30 | | | 3.0 | 0.7 | | |
| 19 | ZK60 | | | 6.0 | 0.7 | | |
| 20 | Z1 | | | 1.0 | | | |

[1] Balance commercial magnesium.

TABLE II.—ALUMINUM BASE ALLOYS FOR ANODES

| Alloy and Temper | Composition |
|---|---|
| 2S-O | "Commercially pure" aluminum. |
| 2S-H | Do. |
| 3S-O | Al+1.2% Mn. |
| 3S-H | Al+1.2% Mn. |
| 17S-T | Al+4.0% Cu+0.5% Mn+0.5% Mg. |
| 24S-T | Al+4.5% Cu+0.6% Mn+1.5% Mg. |
| 52S-O | Al+2.5% Mg+0.25% Cr. |
| 52S-H | Al+2.5% Mg+0.25% Cr. |
| 53S-W | Al+0.7% Si+1.3% Mg+0.25% Cr. |
| 53S-T | Al+0.7% Si+1.3% Mg+0.25% Cr. |
| 61S-W | Al+0.25% Cu+0.6% Si+1.0% Mg+0.25% Cr. |
| 61S-T | Al+0.25% Cu+0.6% Si+1.0% Mg+0.25% Cr. |
| 56S | Al+5.25% Mg+0.1% Mn+0.1% Cr. |

The anode may be a cylindrical solid rod or may be in any desired geometrical configuration. The anode may be fed into the reaction zone by any convenient means. In Figure 1, a rack and pinion is illustrated as one means for accomplishing the desired feeding operation.

*The electrolyte.*—The electrolyte is a liquid, preferably an aqueous solution containing a soluble salt such as sea water or water to which one or more soluble salts have been deliberately added. Chlorides and bromides of alkali metals, alkaline earth metals and ammonium cations may be used in the electrolyte. The electrolyte may be prepared by dissolving the salt in the water to a concentration up to that producing a saturated solution at ordinary temperatures. The concentration does not appear to be critical, although for best results certain concentrations are to be preferred depending upon the particular salt or combination of salts that are used. For example, preferred concentrations of the alkaline earth metal bromides (hydrated) are about 150 to 600 grams, preferably 500 grams, per liter of solution. Example of soluble salts that may be used in the electrolyte are lithium bromide, sodium chloride, magnesium chloride, magnesium bromide, strontium bromide, calcium bromide, ammonium chloride, and ammonium bromide.

In addition to providing an internal electrical connection between the anode and cathode, the electrolyte also removes the spent products of the electrochemical reactions. Thus, provision is made within the fuel cell for circulating the electrolyte through the reaction chamber. Provision may also be made for changing the electrolyte. The electrolyte may be introduced as shown in Figure 1; or by other means, for example, by providing a hollow anode through which the electrolyte is introduced.

*The cathode.*—According to the invention, the cathode includes an organic oxidizing material in which the oxidizing properties are due at least in part to nitro, nitroso, azo, or positive halogen groups chemically combined therein. During the electrochemical reaction, the material undergoes a reduction as the fuel cell furnishes electric power. Organic oxidizing materials which are liquid at the operating temperature are illustrated in Example 1. Organic oxidizing materials which are soluble in liquids may be used in the apparatus of the type illustrated in Figure 1 as solutions thereof. The organic oxidizing materials which are solid at the operating temperatures, including those materials which are either soluble or insoluble in solvents, may be used in the apparatus of Figures 3 and 4 hereinafter described.

The following lists give examples of organic oxidizing substances which are useful in the fuel cells of the invention.

*Nitro organic compounds*

Nitropropane (liquid)
Meta dinitrobenzene (solid)
2,2 chloronitropropane (liquid)
Potassium dinitrobenzene sulfonate (aqueous solution)

*Nitroso organic compounds*

P-nitrosodimethylaniline (solid)
P-dinitrosobenzene (solid)
4-nitrosophenol (solid)

*Azo organic compounds*

N,N' dichloroazodicarbonamidine (solid)
Azodicarbonamide (solid)

*Positive halogen organic compounds*

N,N' dichlorodimethylhydantoin (aqueous solution)
N,N' dichlorodimethylhydantoin (solid)
Hexachloromelamine (solid)
Trichloromelamine (solid)
Trichloroisocyanuric acid (solid)

Any organic compound, having nitro, nitroso, azo or positive halogen groups are useful in the cathodes for the fuel cells herein. The fuel cells herein use the electron change obtained by converting nitrogen or a positive halogen to a lower oxidation state. For example, in a nitro organic compound, nitrogen with a valence of $+3$ is converted to nitrogen with a valence of $-3$. Or, in the case of a positive halogen, a halogen with a valence of $+1$ is converted to a halogen with a valence of $-1$. This is shown by the following equations:

$$N^{+3} + 6e \rightarrow N^{-3}$$
$$Cl^{+1} + 2e \rightarrow Cl^{-1}$$

In addition to foregoing groups, the organic oxidizing materials for the cathode may have other groups in their structure, for example, the following groups may be included: $-CONH_2$, $-SO_3H$, $-CHO$, $-CO_2H$, $-CO_2R$, $-X$, $-COR$, $-COCO_2H$, $-CN$, $-CX_3$, $-NH_3^+$, $-NR_3^+$, $-OH$, $-OR$, $-OAc$, $-NO$, $-NH_2$, $-NHR$, $-NR_2$, $-NHAc$, $-N=N-$, $-CH_3$, $-CH_2SO_3H$, $-CH_2CO_2H$, $-CH_2NH_2$, $-CH_2CN$, $-CH_2CH_2CO_2H$, $-CH=CHCO_2H$, $-CH=CHNO_2$, $-C=OCO_2H$, $-C_6H_5$, Na, K; where R represents an alkyl radical, Ar represents an aromatic radical and X represents a halogen.

A nitro organic compound may include more than one nitro group in its structure. Although all nitro organic compounds may be used in fuel cells of the invention, some of the more complex compounds having more than two nitro groups are unstable and, as a practical matter, would not be employed in their unstable state. In addition, various of the foregoing groups may be combined in a nitro organic compound to vary its potential, solubility, stability and capacity. For example, when meta-directing groups, such as $-NO_2$, $-SO_3H$, $-COOH$, are combined in compounds including a benzene ring, then fuel cells employed such compounds as cathode materials have a higher operating voltage. As another example, when a nitro organic acid compound is esterified, its solubility is decreased. The cathodes of the fuel cells of the invention may also comprise a mixture of one or more nitro organic compounds, or a mixture with one or more other organic oxidizing compounds, such as nitroso organic compounds, or with inorganic cathode materials such as manganese dioxide or the like.

For many situations, it is desirable to increase the electrical conductivity of the cathode where the cathode is solid. One may add varying proportions of non-reactive conductive materials to obtain the desired electrical conductivity. Carbon is a preferred material for this purpose because of its low cost and easy availability. Any of the various forms of carbon such as graphite or acetylene black may be used. The conducting material may comprise up to 80% by weight of the cathode mix.

In some cases, it is desirable to increase the active surface on the cathode. One method for increasing the active surface is to add a portion of a soluble material such as sodium chloride to the mix before the fabrication. Upon fabrication, the soluble material is dissolved out of the cathode leaving a somewhat porous structure with a greatly increased proportion of active surface. It is noteworthy that the cathode used in the fuel cells of the invention may all be produced in the United States by processes well known in the chemical arts.

These materials may be produced synthetically and many materials such as meta-dinitrobenzene are commercially available in large quantities at the present time, graphite and acetylene black are also available from sources within the United States. In addition there are a large number of compounds which may be used which have a high theoretical capacity per unit of volume and which have a wide variety of chemical and physical properties. Thus, one may select the material according to the application of which the fuel cell is part.

Further advantages of the fuel cells and processes herein over previous fuel cells and processes is that they are operative at the ranges of temperature and pressure ordinarily endurable by man. Thus, they are operative at pressures found at sea level, at high altitudes (circa 70,000 feet) and at pressures encountered by submarines. Similarly, they are operative at least between 0° and 90° C.

*Example 2.*—The fuel cell of Figures 1 and 2, is operated as in Example 1 except that the cathode material comprises an aqueous solution saturated with N,N' dichlorodimethylhydantoin, hereinafter referred to as Halane, (trademark of the Wyandotte Chemicals Corporation, Wyandotte, Michigan) and 500 grams/liter of $MgBr_2 \cdot 6H_2O$. The fuel cell provides about 1.6 volts at a current drain of 200 ma.

The electrochemical reaction is believed to be either due to the hydrolysis of the Halane to yield $OCl^-$ ions, or the oxidation of $Br^-$ ions of the electrolyte to $Br_2$. Either is capable of undergoing electrochemical reduction. The solubility of the Halane may also play a role in the electrochemical reaction.

*Example 3.*—Figure 3 illustrates a fuel cell of the invention using a solid anode and a solid cathode. The structure is essentially the same as the cell of Figure 1 with the following exceptions: (1) The cathode assembly is replaced with the solid anode (2) the electrolyte overflow is replaced with a discharge pump 36 and a duct 38, (3) a porous spacer 24 prevents short-circuiting between the anode and the cathode, and (4) a solid cathode replaces the anode.

The cathode may be prepared by melting 80 grams Halane with 40 grams graphite and casting the mixture to a rod about 1.062 inches diameter and 2 inches long. The top of the cathode is cut square. An anode 21a, similar in composition to that of Example 1, is coated with a resist 26 such as silicone grease, over its entire surface except the top.

In operation the anode 21a is put in place, the electrolyte brought to the desired level and the cathode lowered into the electrolyte. When electrical energy is withdrawn from the cell, the cathode undergoes chemical reduction. Simultaneously, the cathode is fed toward the anode to maintain a constant spacing and the electrolyte level lowered. The spent reaction products are removed by agitation and circulation of the electrolyte. Using an anode of AZ10A magnesium alloy 1.14" in diameter and the recited cathode, the cell provided 1.96 volts at a drain of 100 ma.

*Example 4.*—A fuel cell is provided similar to that of Example 3 except that the positions of the cathode 25a and anode 21a are reversed and the cathode instead of the anode is coated with a resist.

*Example 5.*—A fuel cell is provided similar to that of Example 3 except both the cathode 25a and the anode 21a are fed downward into the electrolyte. Using an anode of 24 ST aluminum alloy and 1.14" in diameter and the cathode of Example 3, the cell provided 0.80 volt at a drain of 40 ma. Using an anode of battery grade zinc 0.25" in diameter and the cathode of Example 3, the cell provided 0.88 volt at a 40 ma. drain. Using an anode of AZ10A magnesium alloy 1.14" in diameter, and the cathode of Example 3, the cell provided 0.78 volt at a drain of 100 ma.

*Example 6.*—Figure 4 illustrates a fuel cell using a solid anode 21b and a solid cathode 25b fed in a horizontal direction by feed means 31b and 32b respectively. The anode and cathode are fed into a container 15b through liquid seals 16 and 18. The electrolyte is pumped in and/or out by pumps 35b and 36b or either one. The operation is similar in other respects to Example 3.

*Example 7.*—The fuel cell of Figures 1 and 2, is operated as in Example 1 except that the cathode material comprises an aqueous solution saturated with potassium 2,4 dinitrobenzene sulfonate. The fuel cell provides about 0.90 volt at a current drain of 100 ma.

*Example 8.*—The fuel cell of Figure 3 is operated as in Example 3 except that the cathode comprises a shaped and dried mixture of 2 parts by weight meta-dinitrobenzene, 1 part by weight carbon, 1.5 parts by weight hexahydrated magnesium bromide. The fuel cell provides about 0.9 volt at a current drain of 100 ma.

What is claimed is:

1. A continuous electrochemical method for providing electric power at a desired rate comprising introducing a solid metallic anode into a reaction zone of a fuel cell at a rate which is a function of the rate at which electric power is desired, introducing a cathode into said reaction zone at a rate which is a function of the rate at which electric power is desired, said cathode including an organic oxidizing material in which the oxidizing properties are due at least in part to a chemical radical combined therein, said radical being selected from the group consisting of nitro, nitroso, azo and positive halogen, maintaining an electrolyte in contact with said anode and said cathode, drawing the electric power generated in said reaction at said desired rate, removing the reaction products from said reaction zone, and maintaining each of said steps at substantially normal temperatures and pressures.

2. A continuous electrochemical method for providing electric power at a desired rate comprising introducing a solid metallic anode into a reaction zone of a fuel cell at a rate which is a function of the rate at which electric power is desired, introducing a cathode into said reaction zone at a rate which is a function of the rate at which electric power is desired, said cathode including an organic oxidizing material having at least one radical selected from the group consisting of nitro- nitroso, azo, and positive halogen, maintaining an aqueous electrolyte in contact with said anode and said cathode, drawing the electric power generated in said reaction zone at said desired rate, removing the reaction products from said zone, and maintaining each of said steps at substantially normal temperatures and pressures.

3. A fuel cell for operation at substantially normal temperatures and pressures comprising a reaction chamber, means for feeding a solid metallic anode into said reaction chamber, means for feeding a cathode into said reaction chamber, said cathode comprising an organic oxidizing material in which the oxidizing properties are due at least in part to a chemical radical combined therein, said radical being selected from the group consisting of nitro, nitroso, azo, and positive halogen, means for circulating liquid electrolyte through said reaction chamber, means for maintaining said anode and said cathode in a predetermined spaced relationship, and connection means for conducting electric power from said device, attached thereto.

4. A fuel cell for operation at substantially normal temperatures and pressures comprising a reaction chamber, an anode, means for continuously feeding said anode into said reaction chamber, a cathode including an organic oxidizing material having at least one radical selected from the group consisting of nitro, nitroso, azo and positive halogen, means for continuously feeding said cathode into said reaction chamber, a liquid electrolyte, means for circulating said electrolyte through said reaction chamber, means maintaining said anode and said cathode in a predetermined spaced relationship and connection means for drawing electric power from said device connected thereto.

5. The fuel cell of claim 4 wherein said organic oxidizing material includes positive halogen radicals.

6. The fuel cell of claim 5 wherein said organic oxidizing material is N,N' dichlorodimethylhydantoin.

7. The fuel cell of claim 5 where said organic oxidizing material is 2,2 chloronitropropane.

8. The fuel cell of claim 4 wherein said organic oxidizing material includes azo radicals therein.

9. The fuel cell of claim 8 wherein said organic oxidizing material is azodicarbonamidine.

10. The fuel cell of claim 4 wherein said organic oxidizing material includes nitroso radicals therein.

11. The fuel cell of claim 10, wherein said organic oxidizing material is para nitrosodimethylaniline.

12. The fuel cell of claim 4 wherein said organic oxidizing material includes nitro radicals therein.

13. The fuel cell of claim 12 wherein said organic oxidizing material is potassium 2,4 dinitrobenzene sulfonate.

14. The fuel cell of claim 12 wherein said organic oxidizing material is meta-dinitrobenzene.

References Cited in the file of this patent

UNITED STATES PATENTS

| | | |
|---|---|---|
| 402,915 | Friedlander | May 7, 1889 |
| 433,738 | Maquay | Aug. 5, 1890 |
| 884,664 | Junger | Apr. 14, 1908 |
| 979,153 | Gugler | Dec. 20, 1910 |
| 1,134,093 | Bauer | Apr. 6, 1915 |
| 2,306,927 | Arsem | Dec. 29, 1942 |
| 2,581,650 | Gorin | Jan. 8, 1952 |
| 2,615,931 | Hatfield | Oct. 28, 1952 |
| 2,830,109 | Justi et al. | Apr. 8, 1959 |

OTHER REFERENCES

Vinal, G.W.: "Primary Batteries," John Wiley & Sons, New York, 1950, pages 7–8.